(12) United States Patent
Matthews, Jr. et al.

(10) Patent No.: US 11,816,228 B2
(45) Date of Patent: Nov. 14, 2023

(54) METADATA TWEAK FOR CHANNEL ENCRYPTION DIFFERENTIATION

(71) Applicant: Advanced Micro Devices, Inc., Santa Clara, CA (US)

(72) Inventors: Donald P. Matthews, Jr., Fort Collins, CO (US); William A. Moyes, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/032,984

(22) Filed: Sep. 25, 2020

(65) Prior Publication Data

US 2022/0100870 A1 Mar. 31, 2022

(51) Int. Cl.
*G06F 21/60* (2013.01)
*H04L 9/14* (2006.01)

(52) U.S. Cl.
CPC .............. *G06F 21/602* (2013.01); *H04L 9/14* (2013.01)

(58) Field of Classification Search
CPC .... G06F 21/602; G06F 12/1466; G06F 21/78; G06F 21/10; G06F 21/606; G06F 21/77; H04L 9/14; H04L 2209/56; H04L 9/0838; H04L 9/089; G11B 20/00086; G11B 20/0021; G11B 20/10; G11B 27/105
See application file for complete search history.

(56) References Cited

U.S. PATENT DOCUMENTS

| | | | |
|---|---|---|---|
| 4,916,649 A | 4/1990 | Yorozu | |
| 5,010,573 A | 4/1991 | Musyck | |
| 5,365,588 A | 11/1994 | Bianco | |
| 6,038,317 A | 3/2000 | Magliveras | |

(Continued)

FOREIGN PATENT DOCUMENTS

| | | |
|---|---|---|
| CN | 106254070 B | 4/2019 |
| EP | 1662739 B1 | 9/2008 |

OTHER PUBLICATIONS

Hoban, et al., "Unleashing Linux*-Based Secure Storage Performance with Intel® AES New Instructions", White Paper, Intel Corporation; Feb. 2013, 28 pages.

(Continued)

*Primary Examiner* — Abiy Getachew
(74) *Attorney, Agent, or Firm* — KOWERT HOOD MUNYON RANKIN AND GOETZEL PC; Rory D. Rankin

(57) ABSTRACT

Systems, apparatuses, and methods for implementing a metadata tweak for channel encryption differentiation are disclosed. A memory controller retrieves a device-unique identifier (ID) from a memory device coupled to a given memory channel slot. The memory controller uses the device-unique ID to generate a tweak value used for encrypting data stored in the device. In one scenario, the device-unique ID is embedded in the address bits of the tweak process. In this way, the memory device can be migrated to a different memory channel since the data can be decrypted independently of the channel. This is possible (Continued)

since the device-unique ID used for the tweak operation is retrieved from the metadata stored locally on the memory device. In one implementation, the memory device is a persistent dual in-line memory module (DIMM). In some implementations, the link between memory controller and memory device is a compute express link (CXL) compliant link.

20 Claims, 8 Drawing Sheets

(56) References Cited

U.S. PATENT DOCUMENTS

| | | | |
|---|---|---|---|
| 6,206,282 B1 | 3/2001 | Hayes | |
| 6,868,404 B1 * | 3/2005 | Ono | G11B 20/00557 |
| | | | 705/52 |
| 6,961,426 B2 | 11/2005 | Vesely | |
| 7,260,726 B1 | 8/2007 | Doe | |
| 7,352,070 B2 | 4/2008 | Ellis | |
| 7,382,877 B2 | 6/2008 | Chen | |
| 7,401,223 B2 | 7/2008 | Walmsley | |
| 7,421,074 B2 | 9/2008 | Jin | |
| 7,743,306 B2 | 6/2010 | Wen | |
| 8,311,222 B2 | 11/2012 | Rawson, Sr. | |
| 8,930,714 B2 | 1/2015 | Glew et al. | |
| 10,423,541 B1 * | 9/2019 | Levin | G06F 12/08 |
| 2005/0175182 A1 * | 8/2005 | Ueno | G06F 21/62 |
| | | | 380/277 |
| 2007/0244951 A1 | 10/2007 | Gressel | |
| 2008/0304664 A1 | 12/2008 | Suthaharan | |
| 2010/0142705 A1 | 6/2010 | Reffe | |
| 2012/0311317 A1 * | 12/2012 | Elrod | H04L 9/0822 |
| | | | 713/150 |
| 2018/0137294 A1 * | 5/2018 | Van Antwerpen | G06F 3/0661 |
| 2018/0300261 A1 * | 10/2018 | Narayanasamy | G06F 13/16 |
| 2020/0125501 A1 * | 4/2020 | Durham | G06F 9/45558 |

OTHER PUBLICATIONS

International Search Report and Written Opinion in International Application No. PCT/US2021/051831, dated Jan. 4, 2022, 12 pages.

* cited by examiner

METADATA TWEAK FOR CHANNEL ENCRYPTION DIFFERENTIATION

BACKGROUND

Description of the Related Art

The use of encrypted memory has been proposed as a way to enhance security in settings where the data owner does not have physical control over the hardware used for execution. Depending on the implementation, any of various encryption algorithms can be used to encrypt data. In one implementation, the advanced encryption standard (AES) Xor-Encrypt-Xor (XEX) Tweakable Block Cipher with Ciphertext Stealing (XTS) (AES-XTS) algorithm. In another implementation, the AES Cipher Block Chaining (CBC) (AES-CBC) algorithm. In other implementations, other encryption algorithms can be used. However, conventional approaches to encrypted memory are vulnerable to rudimentary attack techniques due to the need to individually and separately encrypt cache lines in view of the unpredictability of memory accesses, and the constraints of the typical processor-memory architecture.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing a metadata tweak for channel encryption differentiation are disclosed herein. In one implementation, a computing system includes a plurality of memory channel slots for portable, persistent memory devices. When a memory device is installed in a memory channel slot, the system hardware queries the device for a device-unique identifier (ID). The device-unique ID can be a serial number, manufacturer number, lot number, or otherwise. Then, the hardware stores the device-unique ID in a register associated with the memory channel. When data is written to the memory device, the data is encrypted using a tweak value which is generated based on the device-unique ID. For example, in one implementation, the AES-XTS algorithm is used. In this implementation, the ciphertext is generated based on the following formula: Ciphertext=Tweak XOR AES(Key, Plaintext XOR tweak). In this formula, the "Tweak" value is generated based on the device-unique ID and the address of the data. In one implementation, the "Tweak" value is a concatenation of the device-unique ID with the address. Also, "AES" refers to the AES encryption standard. To decrypt the data, the following formula is applied: Plaintext=Tweak XOR AES(key, Ciphertext XOR tweak).

Based on the above example, if the memory device is migrated to a new computing system, then the memory device can be located on a different channel from the channel on which the memory device was installed in the previous computing system. This is possible since the data is encrypted based on the device-unique ID rather than based on the channel number. For example, in one implementation, a tweak value is generated by encrypting a combination of the data's address with the device-unique ID of the memory device. Then, the data is encrypted using an encryption key and the tweak value. In one implementation, the memory device is a persistent dual in-line memory module (DIMM). In some implementations, the link between the memory controller and the memory device is compliant with the compute express link (CXL). In other implementations, other types of links can be employed.

Figure 1:
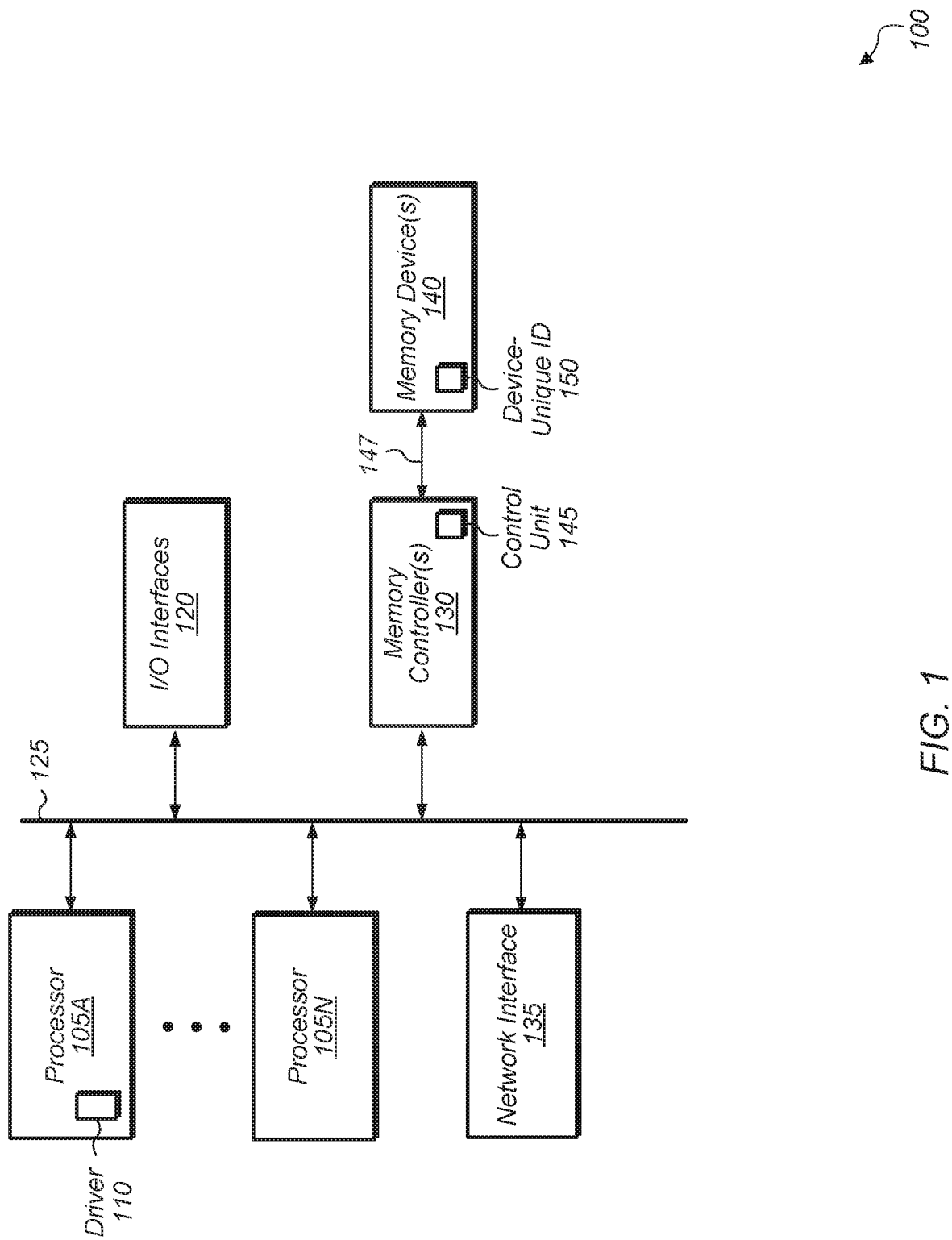
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, and memory device(s) 140. In other implementations, computing system 100 includes other components and/or computing system 100 is arranged differently. Processors 105A-N are representative of any number of processors which are included in system 100.

In one implementation, one or more of processors 105A-N are a general purpose processor, such as a central processing unit (CPU). In one implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, one or more of processors 105A-N are data parallel processors with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In another implementation, one or more of processors 105A-N are secure processors or secure co-processors which generate encryption keys and coordinate security operations for system 100. In other implementations, processors 105A-N include other types of processors.

I/O interfaces 120 are representative of any number and type of I/O interfaces (e.g., peripheral component interconnect (PCI) bus, PCI-Extended (PCI-X), PCI Express (PCIe) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is able to receive and send network messages across a network.

Memory controller(s) 130 are representative of any number and type of memory controllers accessible by processors 105A-N. While memory controller(s) 130 are shown as being separate from processor 105A-N, it should be understood that this merely represents one possible implementation. In other implementations, a memory controller 130 can be embedded within one or more of processors 105A-N or a memory controller 130 can be located on the same semiconductor die as one or more of processors 105A-N. Memory controller(s) 130 are coupled to any number and type of memory devices(s) 140.

In one implementation, each memory controller 130 includes a control unit 145 for encrypting data stored on a corresponding memory device 140. It is noted that control unit 145 can also be referred to as encryption engine 145. It is also noted that control unit 145 can be located outside of memory controller 130 in other implementations. In other words, control unit 145 can be placed in any suitable location within system 100. In one implementation, the control unit 145 retrieves a device-specific identifier (ID) 150 from the corresponding memory device 140 via interface 147. Interface 147 is representative of any type of interface which can vary from implementation to implementation. In one implementation, interface 147 uses a compute express link (CXL) protocol over a PCIe transport. In other implementations, interface 147 can use other types of protocols and/or can be other types of interfaces.

After retrieving the device-specific ID 150 from the memory device 140, the control unit 145 encrypts the device-specific ID and an address of the data being encrypted or decrypted to generate a tweak value. Data stored in memory device 140 is encrypted using an encryption key and the tweak value. In one implementation, the data stored in memory device 140 is encrypted using the encryption key and the tweak value in accordance with the AES-XTS standard. More details on these steps will be provided throughout the remainder of this disclosure.

Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. In one implementation, one or more of memory device(s) 140 are non-volatile dual in-line memory modules (NVDIMMs). Non-volatile memory is memory that retains its contents even when electrical power is removed.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
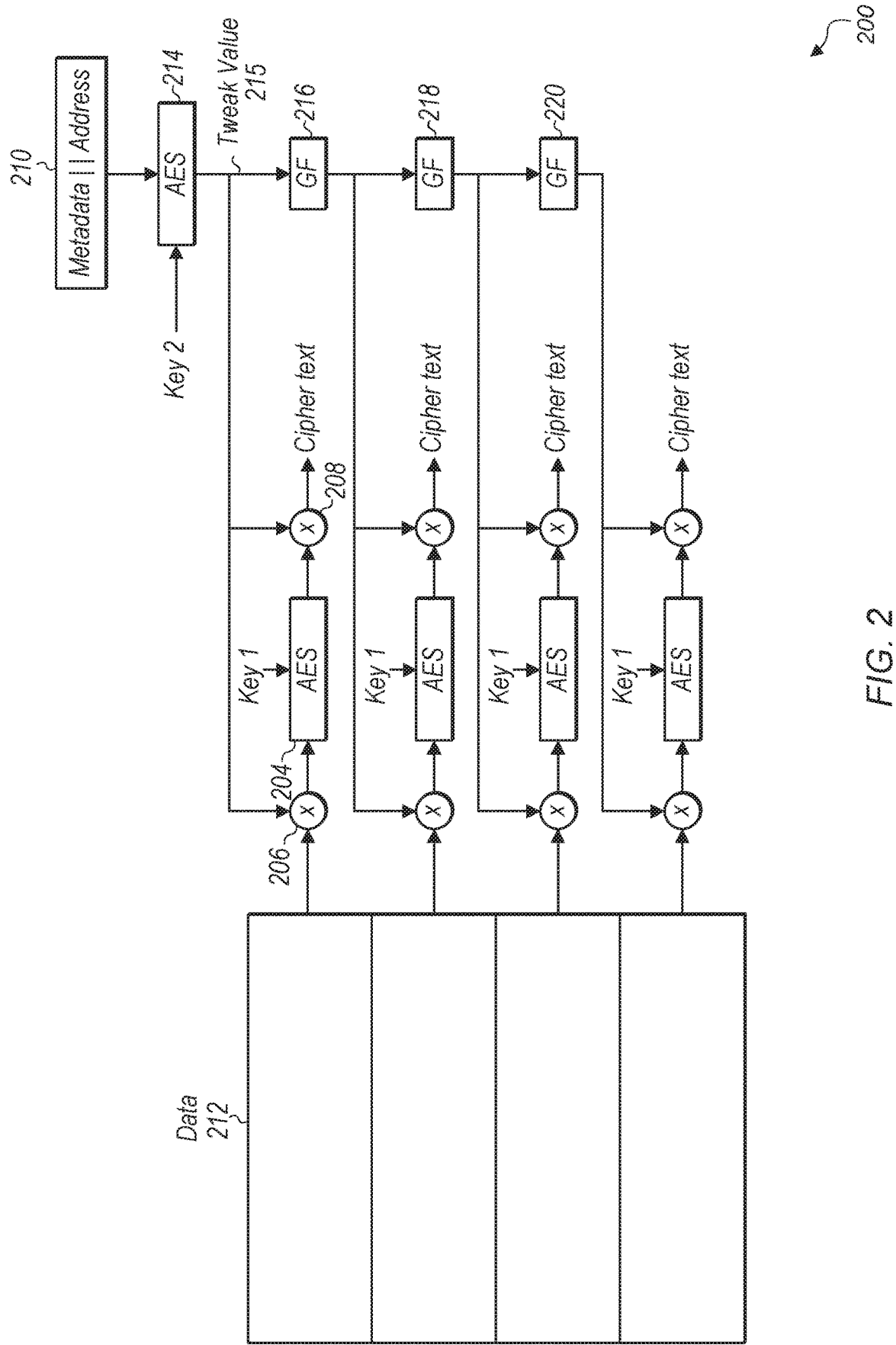
FIG. 2 is a block diagram of one implementation of a system for encrypting data.

Turning now to FIG. 2, a block diagram of one implementation of a system 200 for encrypting data is shown. System 200 includes a first encryption key 204 and a second encryption key 214 which can be generated and stored in any suitable locations. In one implementation, metadata is retrieved from a memory device, with the metadata being unique to the memory device. The metadata can be a portion or the entirety of a serial number, manufacturer number, lot number, or otherwise, or any combination thereof. The metadata can also be referred to herein as a "device-unique ID", "device-specific ID", or "device-specific value". In one implementation, the device-unique ID is generated from the retrieved metadata (e.g., serial number, manufacturer number, lot number) using an algorithm such as a hash algorithm. In some cases, the device-unique ID is a portion of the resulting algorithm. For example, if the algorithm generates a 256-bit result, the device-unique ID could be 64 bits of this 256-bit result. In one implementation, each memory channel has a metadata register to store the metadata. The size of the register in number of bits can vary from implementation to implementation. In some cases, there can be multiple metadata registers per memory channel when there are multiple devices connected to the memory channel.

Data 212 is representative of blocks of data stored in a memory device, cache device, or otherwise. In one implementation, data 212 is representative of cache line data stored in a cache. In various implementations, the address of the data 212 being accessed is combined with the metadata retrieved from the memory device to generate value 210. In one implementation, the metadata is concatenated with the address of the data 212 being encrypted. In other implementations, the metadata is combined in other ways with the data address to generate value 210.

Then, when encrypting a data block of data 212, data value 210 is encrypted by encryption key 214 to generate tweak value 215. Next, tweak value 215 is combined with the data in a logical and/or mathematical operation 206. In one implementation, the operation 206 is an XOR operation. Then, the output of operation 206 is encrypted with a first encryption key in encryption operation 204. Next, the encrypted data is combined in operation 208 (e.g., an XOR operation) with tweak value 215 to generate the cipher text which is the encrypted version of the original plain text. Each subsequent data block of data 212 is encrypted in a similar fashion, with the tweak value 215 being modified by Galois Field (GF) multipliers 216, 218, and 220 for each subsequent data block. Later on when the encrypted data is retrieved from memory, the above operations can be reversed to decrypt the data.

Figure 3:
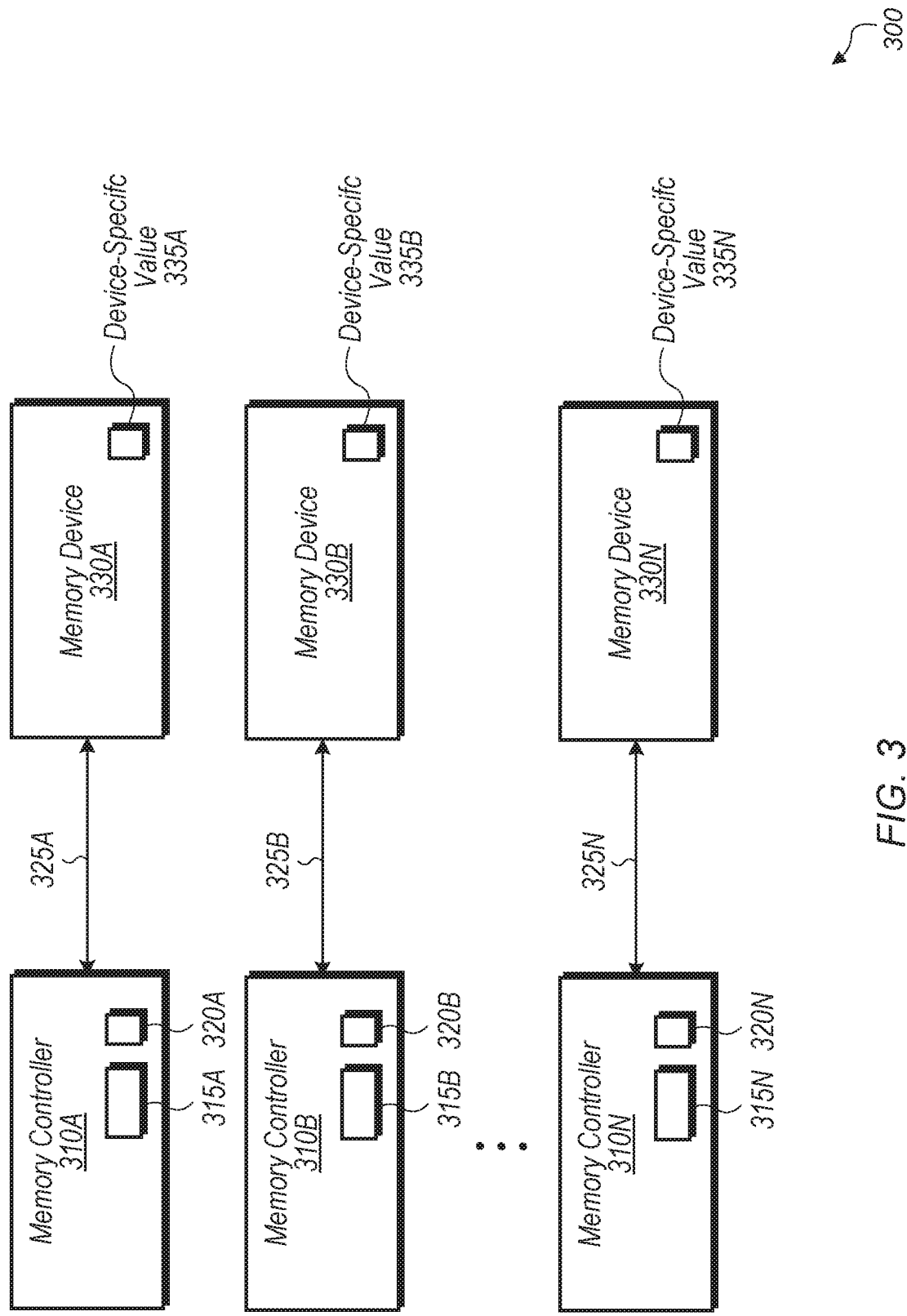
FIG. 3 is a block diagram of one implementation of a plurality of memory channels.

Referring now to FIG. 3, a block diagram of one implementation of a plurality of memory channels 325A-N are shown. In one implementation, computing system 300 includes a plurality of memory channels 325A-N connected to memory devices 330A-N. In one implementation, each memory channel 325A-N is coupled to a corresponding memory controller 310A-N. It is noted that memory channels 325A-N are representative of any number of memory channels. Likewise, memory controllers 310A-N and memory devices 330A-N are representative of any number of memory controllers and memory devices, respectively.

In one implementation, each memory controller 310A-N includes an encryption engine 315A-N for encrypting data stored in a corresponding memory device 330A-N. Each encryption engine 315A-N also decrypts data retrieved from a corresponding memory device 330A-N in response to a read request targeting the device. To encrypt data, the encryption engine 315A-N retrieves a device-specific value (i.e., device-unique ID) 335A-N from the corresponding memory device 330A-N. It is noted that the device-specific value can be referred to more generally as "metadata". Then, the encryption engine 315A-N stores the retrieved device-specific value in a corresponding metadata register 320A-N. The encryption engine 315A-N uses the device-specific value to generate a tweak value which will be used as part of the encryption algorithm to encrypt the data being stored on the memory device.

In one implementation, the device-specific value 335A-N is concatenated with the address of the data being accessed, and then the concatenated value is encrypted to generate the tweak value. In other implementations, the device-specific value 335A-N is combined in other manners with the data's address, with the combination encrypted to generate the tweak value. Then, the tweak value is used to encrypt the data being stored on the memory device 330A-N. In one implementation, the following operation is used to encrypt the data: Ciphertext=Tweak XOR AES(Key, Plaintext XOR Tweak). In the above formula, "AES" refers to an advanced encryption standard (AES) compatible operation. Also, in the above formula, "Tweak" refers to the tweak value generated by encrypting the combination of the device-specific value 335A-N and address. In other implementations, other suitable types of operations can be used to encrypt the data with the tweak value generated from the device-specific value 335A-N.

Figure 4:
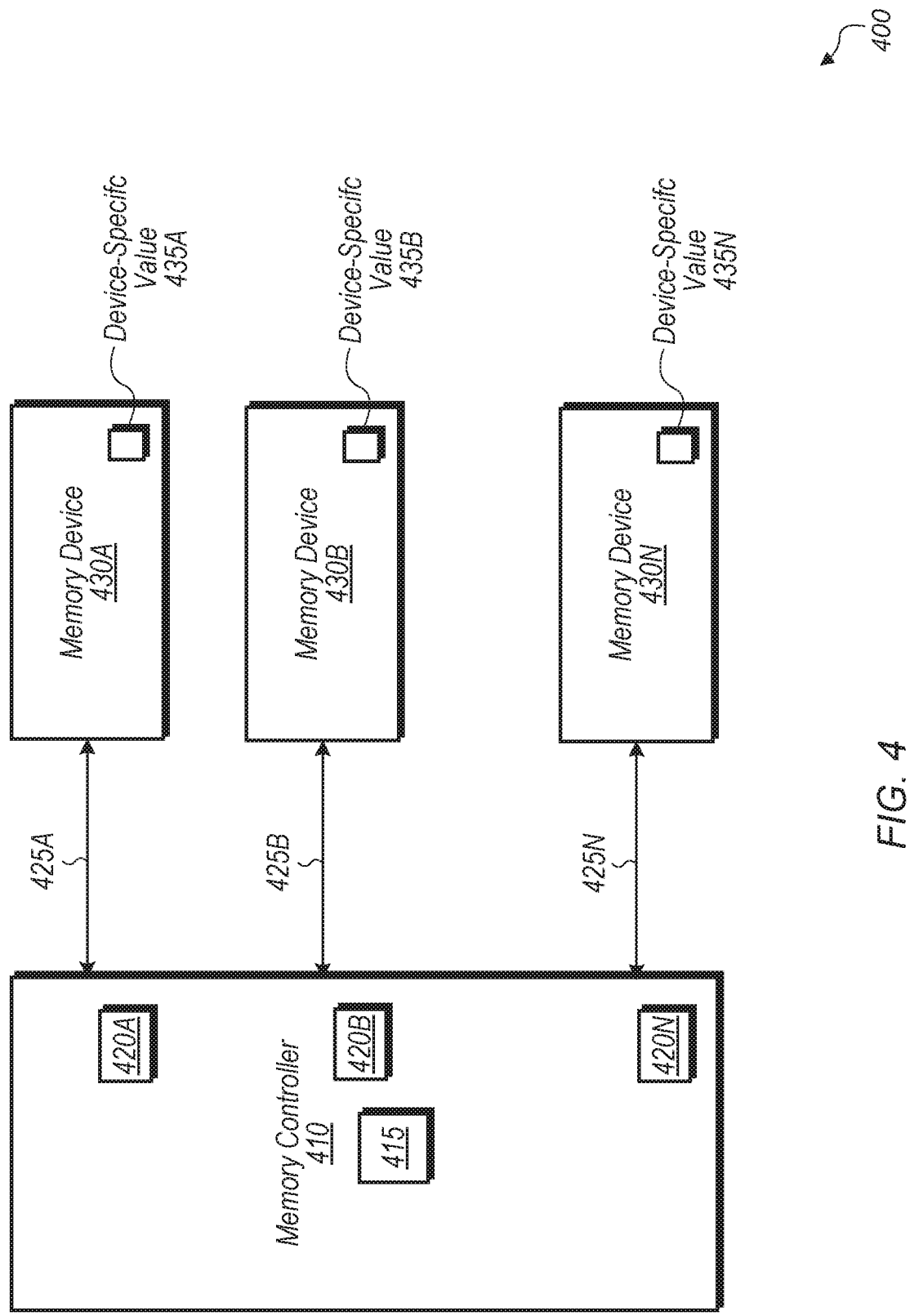
FIG. 4 is a block diagram of one implementation of a computing system.

Turning now to FIG. 4, a block diagram of one implementation of a computing system 400 is shown. Computing system 400 is similar to computing system 300 (of FIG. 3) with the exception that computing system 400 has a single memory controller 410 whereas computing system 300 has multiple memory controllers 310A-N. Also, computing system 400 has a single encryption engine 415 rather than a separate encryption engine 315A-N for each channel 325A-N in computing system 300. Otherwise, the functionality of computing system 400 for encrypting data uses similar techniques to retrieve device-specific values 435A-N from the memory devices 430A-N via interfaces 425A-N. These device-specific values 435A-N are stored in corresponding metadata registers 420A-N and used to generate tweak values based on the device-specific values 435A-N and addresses of the targeted data. Each tweak value is then used to encrypt the data that gets stored on a corresponding memory device 430A-N. While two examples of different types of systems 300 and 400 are shown in FIGS. 3-4, it should be understood that any number of other types of systems can use the encryption techniques described herein. In other words, FIGS. 3-4 are meant as non-limiting examples of systems. Also, some systems can combine some portions of components with the structure of system 300 and some portions of components with the structure of system 400. Other types of systems with other arrangements of components are possible and are contemplated.

Figure 5:
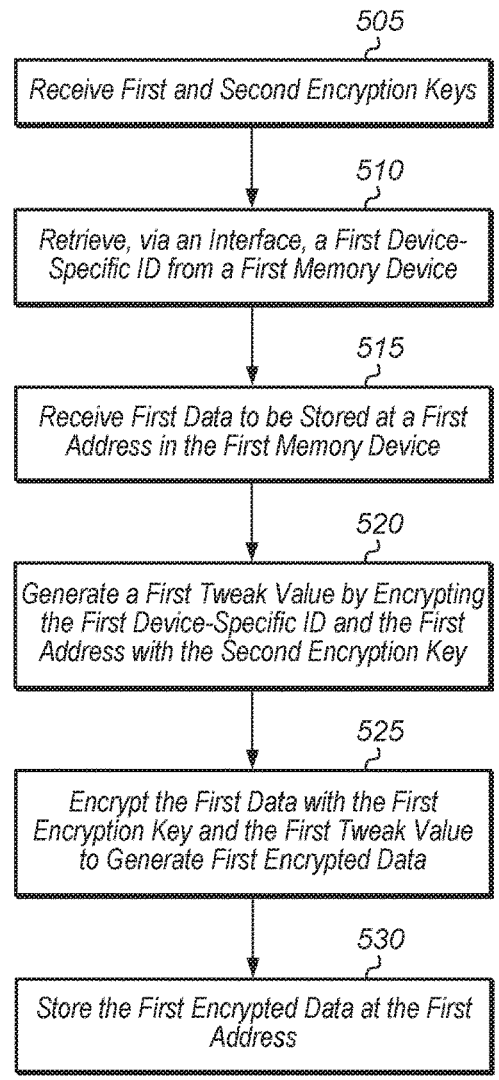
FIG. 5 is a generalized flow diagram illustrating one implementation of a method for using a device-specific ID to encrypt data on a memory device.
Figure 6:
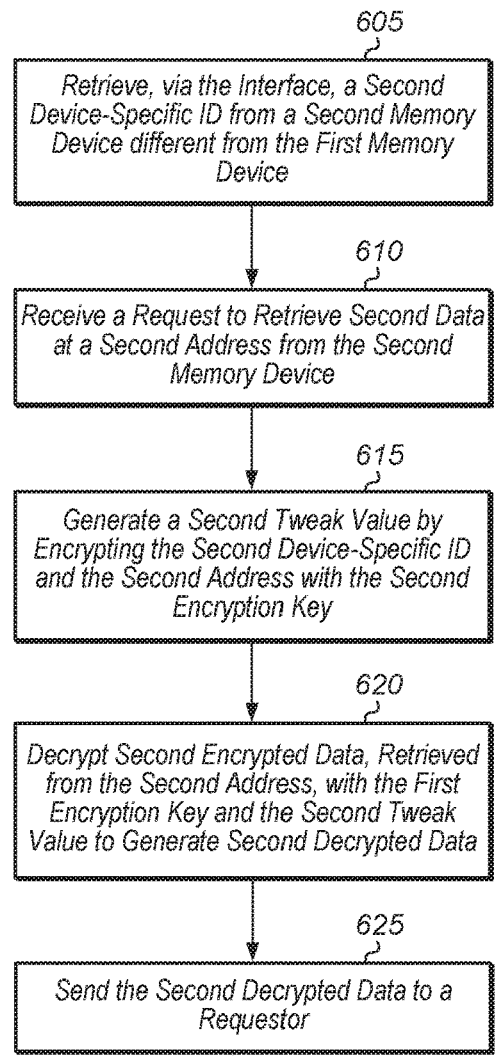
FIG. 6 is a generalized flow diagram illustrating one implementation of a method for using a device-specific ID to decrypt data on a newly installed memory device.
Figure 7:
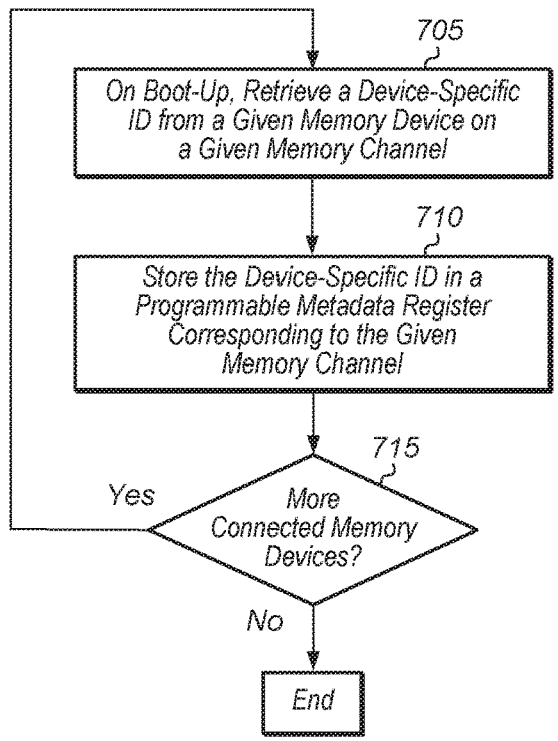
FIG. 7 is a generalized flow diagram illustrating one implementation of a method for generating encryption tweak values on boot-up.
Figure 8:
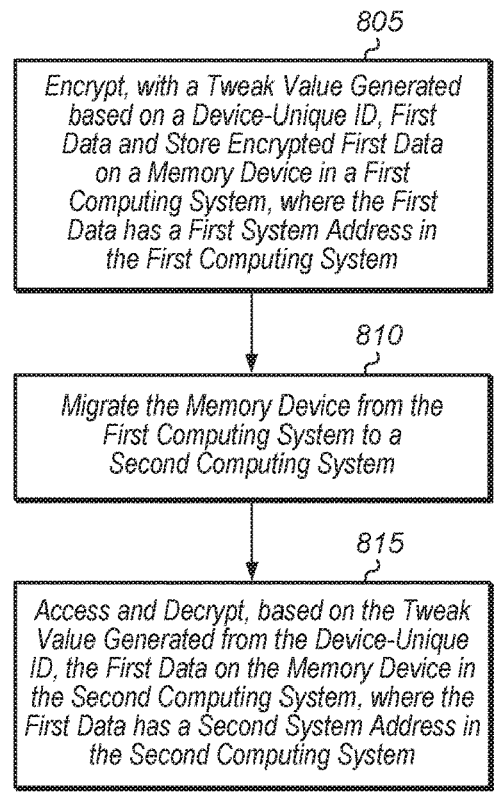
FIG. 8 is a generalized flow diagram illustrating one implementation of a method for migrating a memory device storing encrypted data.

Referring now to FIG. 5, one implementation of a method 500 for using a device-specific ID to encrypt data on a memory device is shown. For purposes of discussion, the steps in this implementation and those of FIG. 6-8 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A control unit (e.g., control unit 145 of FIG. 1) receives first and second encryption keys (block 505). In one implementation, the control unit receives the first and second encryption keys from a secure processor within the computing system (e.g., computing system 100 of FIG. 1). In another implementation, the control unit generates the encryption keys by itself. In other implementations, the control unit receives the encryption keys from any of various other types of devices. Also, the control unit retrieves, via an interface, a first device-specific ID from a first memory device (block 510). In one implementation, the interface includes a plurality of physical interface connections of a memory channel slot.

At a later point in time, the control unit receives first data to be stored at a first address in the first memory device (block 515). In one implementation, the control unit receives the first data from a processor core via a data fabric. In other implementations, the control unit receives the first data from any of various other types of components. It is noted that the first data can also be referred to herein as "first plain text", "first plaintext data", or "first decrypted data". Next, the control unit generates a first tweak value by encrypting the first device-specific ID and the first address with the second encryption key (block 520). In various implementations, the control unit generates an intermediate value from a combination of the first device-specific ID and the first address. Then, the control unit encrypts the intermediate value with the second encryption key to generate the first tweak value. For example, in one implementation, the control unit appends the first device-specific ID to the first address to create the intermediate value. In another implementation, the intermediate value is a hash of the first device-specific ID and the first address. In other implementations, other ways of combining the first device-specific ID and the first address to generate the intermediate value can be employed, with the intermediate value then being encrypted to generate the first tweak value.

Then, the control unit encrypts the first data with the first encryption key and the first tweak value to generate first encrypted data (block 525). In various implementations, the control unit generates the first encrypted data using multiple operations involving the first encryption key, the second encryption key, and the first tweak value. Then, the control unit stores the first encrypted data at the first address (block 530). After block 530, method 500 ends.

Turning now to FIG. 6, one implementation of a method 600 for using a device-specific ID to decrypt data on a newly installed memory device is shown. It is noted that method 600 is intended to be a continuation of the discussion of method 500. In other words, method 600 can be performed by the same control unit at a later point in time after the first memory device has been removed from the memory channel slot and a second memory device has been installed in the memory channel slot.

At the beginning of method 600, the control unit retrieves, via the interface, a second device-specific ID from a second memory device different from the first memory device (block 605). Then, at a later point in time, the control unit receives a request to retrieve second data at a second address from the second memory device (block 610). Next, the control unit generates a second tweak value by encrypting the second device-specific ID and the second address with the second encryption key (block 615). In one implementation, the control unit uses the same technique for generating the second tweak value as for generating the first tweak value (of FIG. 5). It is noted that in at least one implementation, the second encryption key is intended to be used for the purposes of generating tweak values. It is assumed for the purposes of this discussion that the second encryption key was used previously to generate tweak values for encrypting data stored on the second memory device. Also, as described in method 500, the second encryption key is used to generate the first tweak value for the first memory device by encrypting the first device-specific ID and the first address. In one implementation, for other memory devices connected to the control unit, the second encryption key will also be used for the purposes of generating tweak values.

After block 615, the control unit decrypts second encrypted data, retrieved from the second address, with the first encryption key and the second tweak value to generate second decrypted data (block 620). It is assumed for the purposes of this discussion that the first encryption key was previously used to encrypt data stored on the second memory device. It is noted that in at least one implementation, the first encryption key is intended to be used for the purposes of encrypting and decrypting data. For example, in method 500, the first encryption key is used to encrypt data stored on the first memory device. In one implementation, for other memory devices connected to the control unit, the control unit will use the first encryption key for encrypting and decrypting data stored on these memory devices.

After block 620, the control unit sends the second decrypted data to a requestor (e.g., processor core) (block 625). The second decrypted data is intended to represent the second data requested by the requestor. It is noted that the second decrypted data can also be referred to herein as "second plain text" or "second plaintext data". After block 625, method 600 ends.

Referring now to FIG. 7, one implementation of a method 700 for generating encryption tweak values on boot-up is shown. On boot-up, a processor (e.g., processor 105A of FIG. 1) retrieves a device-specific ID from a given memory device on a given memory channel (block 705). The processor stores the device-specific ID in a programmable metadata register corresponding to the given memory channel (block 710). When accessing the given memory device during operation, the processor combines an address of the data being accessed with the device-specific ID to generate a tweak value. The processor uses the tweak value to alter the data in a reversible manner before and after encryption. If there are other memory devices connected to the processor (conditional block 715, "yes" leg), then method 700 returns to block 705. Otherwise, if all memory devices connected to the processor have been discovered and initialized (conditional block 715, "no" leg), then method 700 ends.

Turning now to FIG. 8, one implementation of a method 800 for migrating a memory device storing encrypted data is shown. A memory controller encrypts, with a tweak value generated based on a device-unique ID, first data and stores encrypted first data on a memory device in a first computing system, where the first data has a first system address in the first computing system (block 805). The device-unique ID can be a serial number of the memory device, manufacturer number of the memory device, lot number of the memory device, or otherwise. At a later point in time, the memory device is migrated from the first computing system to a second computing system (block 810). In other words, the memory device is removed from the first computing system and then installed in the second computing system. In one implementation, the first and second computing systems are servers. In other implementations, the first and second computing systems are other types of computing systems or devices. Next, a memory controller in the second system accesses and decrypts, based on the tweak value generated from the device-unique ID, the first data on the memory device in the second computing system, where the first data has a second system address in the second computing system (block 815).

It is noted that the first data is able to be decrypted on the second computing system even though the system address has changed for the first data on the second computing system as compared to the first computing system. While the system address associated with the first data changes from the first computing system to the second computing system, the memory channel offset address for the first data stored on the memory device will be the same for decryption to work. This is an improvement over the prior art, where with the prior art, the first data would not be able to be decrypted if the system address changes between computing systems. This improvement is possible because the first data is encrypted with a key generated from a normalized memory channel address rather than with the system address. After block 815, method 800 ends. It is noted that the "memory channel offset address" can also be referred to herein as a "normalized address". As used herein, the term "normalized address" is defined as an address localized to the address space of a memory device.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   an interface; and
   a control unit comprising circuitry configured to:
      generate a first value based on:
         a first device-specific identifier (ID), retrieved from a first memory device, that uniquely identifies the first memory device; and a first address;
encrypt first data with a first encryption key and the first value to generate first encrypted data; and
store, via the interface, the first encrypted data on the first memory device.

2. The apparatus as recited in claim 1, wherein the control unit is configured to encrypt, with a second encryption key, a combination of the first device-specific ID and the first address to generate the first value, and wherein the first address is a memory channel offset address.

3. The apparatus as recited in claim 1, wherein the first device-specific ID is appended to the first address and encrypted with a second encryption key to generate the first value, and wherein the first device-specific ID is created from a plurality of metadata values retrieved from the first memory device.

4. The apparatus as recited in claim 1, wherein the control unit is configured to:
generate a second value based on:
a second device-specific ID different from the first device-specific ID, retrieved from a second memory device, that uniquely identifies the second memory device; and
a second address;
encrypt second data with a first encryption key and the second value to generate second encrypted data; and
store, via the interface, the second encrypted data on the second memory device.

5. The apparatus as recited in claim 4, wherein:
the interface is a first memory channel;
the second memory device is installed in a first memory channel slot corresponding to the first memory channel after the first memory device is removed from the first memory channel slot;
the second memory device was installed in a second memory channel slot prior to being installed in the first memory channel slot; and
the second memory device stores previously written data.

6. The apparatus as recited in claim 1, wherein the first device-specific ID is based on a serial number of the first memory device.

7. The apparatus as recited in claim 1, wherein the control unit is further configured to:
encrypt, with the first encryption key, an output of a first XOR operation between the first data and the first value to generate intermediate encrypted data; and
perform a second XOR operation between the intermediate encrypted data and the first value to generate the first encrypted data.

8. A method comprising:
receiving, by a control unit comprising circuitry, first data to be stored at a first address in a first memory device;
generating a first value based on:
a first device-specific identifier (ID), retrieved from a first memory device, that uniquely identifies the first memory device; and
a first address;
encrypting the first data with a first encryption key and the first value to generate first encrypted data; and
storing the first encrypted data at the first address in the first memory device.

9. The method as recited in claim 8, further comprising encrypting, with a second encryption key, a combination of the first device-specific ID and the first address to generate the first value, wherein the first address is a memory channel offset address.

10. The method as recited in claim 9, wherein the first device-specific ID is appended to the first address and encrypted with the second encryption key to generate the first value.

11. The method as recited in claim 8, further comprising:
retrieving, via an interface, a second device-specific identifier (ID) from a second memory device different from the first memory device;
receiving a request to retrieve second data at a second address from the second memory device;
generating a second value based on the second address and the second device-specific ID;
decrypting second encrypted data, retrieved from the second address, with the first encryption key and the second value to generate decrypted data; and
sending the decrypted data to a requestor, wherein the decrypted data represents the second data.

12. The method as recited in claim 11, wherein:
the interface is a first memory channel; and
the second memory device is installed in a first memory channel slot corresponding to the first memory channel after the first memory device is removed from the first memory channel slot.

13. The method as recited in claim 12, further comprising:
detecting the first memory device installed in a second memory channel slot after the first memory device is removed from the first memory channel slot;
receiving a request to retrieve the first data at the first address from the first memory device in the second memory channel slot;
retrieving the first device-specific ID from the first memory device in the second memory channel slot;
generating the first value based on the first device-specific ID and the first address;
decrypting the first encrypted data, retrieved from the first address, with the first encryption key and the first value to generate the first data; and
sending the first data to the requestor.

14. The method as recited in claim 8, further comprising:
encrypting, with the first encryption key, an output of a first XOR operaton between the first data and the first value to generate intermediate encrypted data; and
performing a second XOR operation between the intermediate encrypted data and the first value to generate the first encrypted data.

15. A system comprising:
a processor comprising circuitry; and
a memory controller comprising circuitry configured to:
receive first data to be stored by the processor at a first address in a first memory device;
generate a first value based on:
a first device-specific identifier (ID), retrieved from a first memory device, that uniquely identifies the first memory device; and
a first address;
encrypt the first data with a first encryption key and the first value to generate first encrypted data; and
store the first encrypted data at the first address in the first memory device.

16. The system as recited in claim 15, wherein the memory controller is configured to encrypt, with a second encryption key, a combination of the first device-specific ID and the first address to generate the first value, wherein the first address is a memory channel offset address.

17. The system as recited in claim 16, wherein the first device-specific ID is appended to the first address and encrypted with the second encryption key to generate the first value, and wherein the first device-specific ID is created from a plurality of metadata values retrieved from the first memory device.

18. The system as recited in claim 15, wherein the memory controller is further configured to:
retrieve a second device-specific identifier (ID) from a second memory device different from the first memory device;
receive a request to retrieve second data at a second address from the second memory device;
generate a second value based on the second address and the second device-specific ID, wherein the second device-specific ID is different from the first device-specific ID;
decrypt second encrypted data, retrieved from the second address, with the first encryption key and the second value to generate decrypted data; and
send the decrypted data to a requestor, wherein the decrypted data represents the second data.

19. The system as recited in claim 15, wherein the memory controller is configured to use a different device-specific ID to encrypt data for each of a plurality of memory devices.

20. The system as recited in claim 15, wherein the memory controller is further configured to:
store the first device-specific ID in a first metadata register corresponding to a first memory channel corresponding to a first memory channel slot; and
overwrite, in the first metadata register, the first device-specific ID with a second device-specific ID, responsive to detecting a second memory device has been installed in the first memory channel slot.

* * * * *